W. B. GREGORY & A. M. LOCKETT.
MEANS FOR MEASURING WATER FOR IRRIGATION PURPOSES.
APPLICATION FILED APR. 21, 1909.
967,512.
Patented Aug. 16, 1910.
2 SHEETS—SHEET 1.
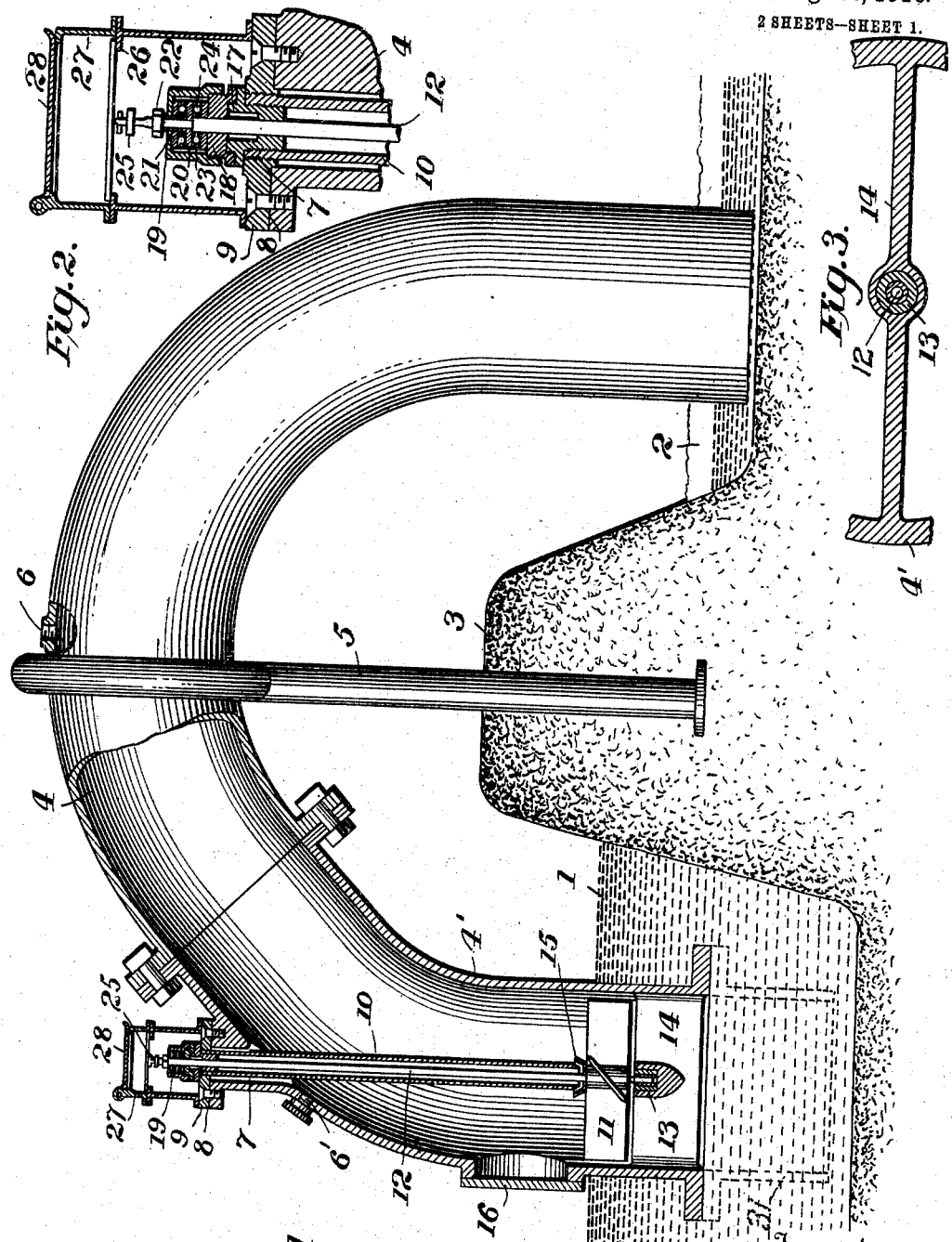

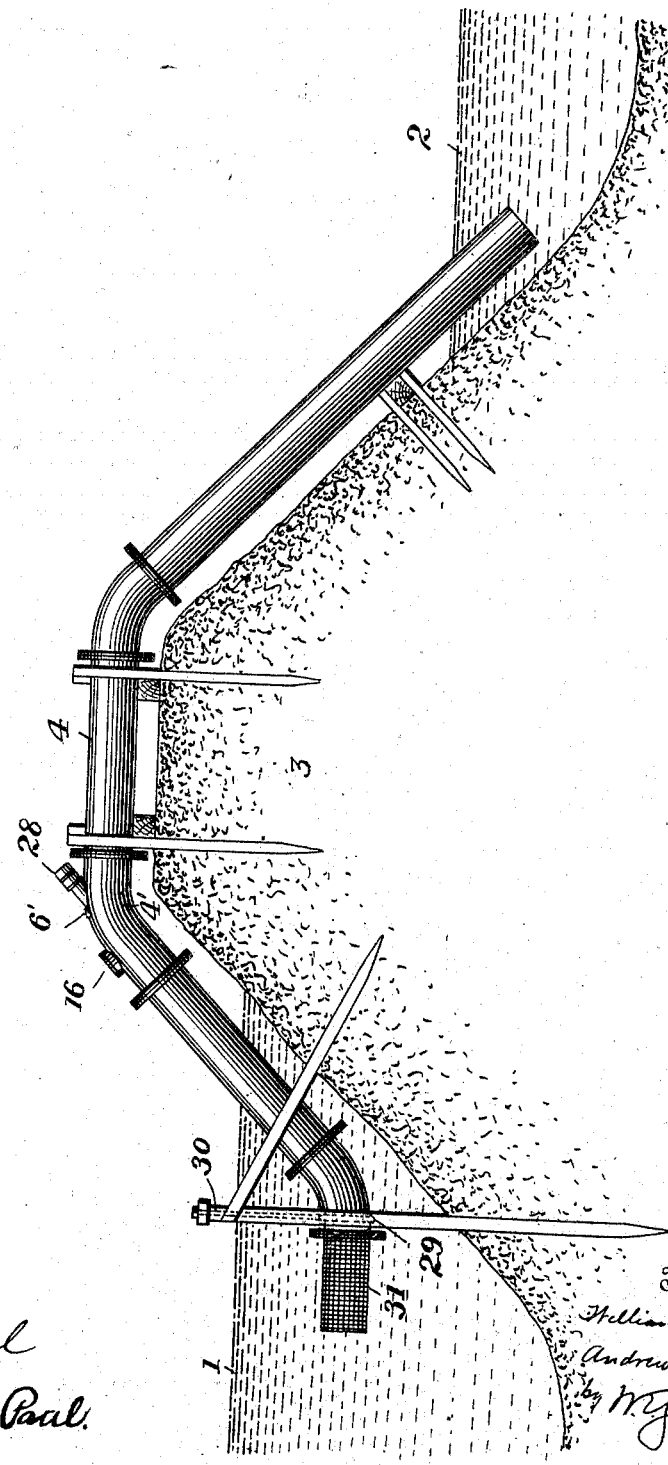

UNITED STATES PATENT OFFICE.

WILLIAM B. GREGORY AND ANDREW M. LOCKETT, OF NEW ORLEANS, LOUISIANA.

MEANS FOR MEASURING WATER FOR IRRIGATION PURPOSES.

967,512. Specification of Letters Patent. Patented Aug. 16, 1910.

Application filed April 21, 1909. Serial No. 491,329.

*To all whom it may concern:*

Be it known that we, WILLIAM B. GREGORY and ANDREW M. LOCKETT, citizens of the United States, residing at New Orleans, in the parish of Orleans and State of Louisiana, have invented certain new and useful Improvements in Means for Measuring Water for Irrigation Purposes, of which the following is a specification.

Our invention relates to means more particularly adapted in measuring water supplied for irrigation purposes.

The object of our invention is to construct and arrange a transmission mechanism with respect to the meter and supply pipe, so that the water passing from the supply canal to the irrigating ditches, may be measured without the use of complicated and expensive measuring devices, and such attachments being easily applied are not apt to be disarranged or need repairs.

At present, the canal companies supplying the tenants with irrigation water, charge so much an acre for furnishing the necessary water to raise a crop. The amount of water actually required depends not only upon the size of the field, but also upon the condition of the levees and soil, and if the levees on a particular farm are in bad condition, a great deal of water is unnecessarily wasted and the negligent lessee or farmer for this reason uses a greater amount of water per acre of field than his more careful or watchful neighbor, and pays no more money to the irrigation company.

Our invention is for the purpose of remedying this unfairness of charge and to provide an inexpensive means for measuring all the water which passes onto a particular farm or lease hold.

There is no regular water meter on the market which can be sold at a sufficiently low price, to justify its use as contemplated by us. The Venturi meter could perform the above-stated service satisfactorily, but the registering apparatus used with the Venturi meter, together with the cost of the meter itself, makes such a meter prohibitive for general use as in irrigation water measurement.

The usual method employed of delivering water from an irrigating canal is through wooden sluice gates built in the canal levees, and it is found these gates give considerable trouble in that they constitute a continual menace in the way of leakage around the outside and through the gates themselves, and owing to this leakage, some irrigating canal companies have adopted siphons made of iron pipe passing over the top of the levee and having both legs of the siphon submerged, the short leg being in the water supply canal and the long leg in a sump on the field side. Our invention is more particularly adapted for such an arrangement and is placed at the top of the levee and constitutes a part of the siphon.

The invention consists of structural features and relative arrangements which will be hereinafter more fully described and particularly pointed out in the appended claims.

Similar reference characters indicate the same parts in the several views of the drawings, in which—

Figure 1 shows the invention as applied to the siphon method for conveying the water from the canal to the field; Fig. 2 is an enlarged sectional view of the upper bearing of shaft and its attaching means to the registering counter. Fig. 3 is an enlarged view of the lower bearing of the shaft, and Fig. 4, is a side elevation of a modified arrangement of the invention.

Referring to the drawing, 1 represents the irrigating water supply canal, and 2 the sump or ditch conveying the water over the farm to be irrigated, said canal and ditch being separated by the canal levee or bank construction 3; 4 is the curved pipe bending over the levee 3 which in this adaptation forms the siphon, the open ends of the pipe as shown being supported a short distance above the bottom of the canal and ditch by any suitable support 5 so as to permit an unobstructed flow of water through the pipe after the siphon has been started. An opening 6 is provided in the pipe 4 for the purpose of attaching a small vacuum pump to exhaust the air in said pipe and start the siphon in operation, and when it is desired to stop the flow of water the vacuum is broken by admitting air through the opening 6. Section 4' of the pipe 4 is provided with an opening 7 having an external horizontal and plane surface 8 for the attachment of a counter and its transmission gear accessories, to be hereinafter described, and shown in detail in Fig. 2. A plate 9, having a central screw threaded opening is securely held by screws on the surface 8, and engaging said central screw threaded opening is a depending hollow cylinder 10 which extends down to a water current wheel 11. A rotary vertical shaft 12 carrying the wheel 11 is supported at its lower end in a bearing 13, formed in a narrow web 14 (see Fig. 3) and is surrounded and protected against impact of the water by the said depending hollow cylinder. To prevent the rushing in of water and grit, into the inner chamber of cylinder 10, and at the same time restrain the lower end of cylinder 11 from lateral movement, a plate-shaped piece 15 is inserted between the wheel 11 and the end of the cylinder, and in order to properly install, adjust, and inspect the bearing 13, wheel 11, plate 15, and cylinder 10, an opening is provided with a removable cap 16.

Screwed into the upper end of cylinder 10 and surrounding the rotary shaft 12 is a stuffing box 17, which insures a tight packing and prevents any water getting into the registering device attached to the upper end of rotary shaft. Within and attached by means of screw threaded cap 18, engaging the internally threaded cover 19 of the stuffing box, is a thrust ball-bearing comprising a disk 20, fastened against a shoulder on the rotary shaft by means of the sleeve 21 held down by a nut 22, engaging threads on upper end of shaft.

23, 23 are the plates retaining the balls 24, 24, on each side of disk 20 receiving the vertical thrust of shaft 12.

25, is any suitable securing device for attaching the rotary shaft 12 to the registering mechanism which may be any form of the ordinary direct reading counters on registers as, for example, manufactured by the Worthington Company, said counter or register being supported on the upper circular ledge 26 of the protecting housing 27 having a pivoted cover 28.

It will be seen from the foregoing construction that the thrust bearing can be removed intact with the stuffing box.

The operation of our invention is as follows: A small air pump is attached to the opening 6 by which a vacuum is created and the siphon started. The water in passing from canal 1, to ditch 2 through the pipe 4, causes the current wheel 11 to rotate and transmit its motion to the shaft 12. The upper and reduced end of said shaft 12 is connected by attachment 25, to any suitable measuring device housed in casing 27, and registering the revolutions of the shaft, and gallons of water passing through the pipe 4.

In Fig. 4, the same general arrangement is shown, with the exception that the pipe section $4^1$ is inclined instead of vertical and the starting opening $6^1$, is in the pipe section $4^1$.

29 is a valve operated by the stem 30 for controlling and shutting off the water supply and 31 is any suitable grating to prevent foreign matter passing into the water pipe.

From the foregoing described construction and arrangement of meter attachment, it will be seen that we have devised a simple, inexpensive and efficient means for measuring the flow of water over a levee. The rotary shaft is tightly packed so that no water can pass into the registering device or air leak into the siphon and is firmly held, well protected, and easily rotatable in its bearings. The upper bearing likewise is easily accessible for repairs, of few parts, and securely held and supported to receive the end thrust of said shaft.

While we have shown our invention as applied to a siphon, we do not wish to confine ourselves to this particular arrangement, as it would be readily suggested to one after seeing our invention how the same could be applied to a supply pipe passing through instead of over the levee.

Having now fully described our invention what we claim as new and desire to secure by Letters Patent is:

1. A water measuring apparatus comprising a conduit having an opening, a water wheel rotatably supported in said conduit, a rotary shaft connected with said wheel and passing through the opening in the conduit, a removable stuffing box surrounding the shaft at the end opposite from that of the wheel, a thrust bearing connected to and removable with the stuffing box and means for connecting the rotary shaft end exterior of the thrust bearing to a register.

2. A water measuring apparatus comprising a conduit having an opening, a water wheel rotatably supported in said conduit, a rotary shaft connected with said wheel and passing through the opening in the conduit, a protecting sleeve independent of the shaft and surrounding the same, a removable stuffing box connected with the protecting sleeve and surrounding the shaft at the end opposite that of the wheel, a thrust bearing connected to and removable with the stuffing box, and means for connecting the rotary shaft end exterior of the thrust bearing to a register.

3. A water measuring apparatus comprising a conduit forming a siphon tube, a water wheel rotatably supported in said conduit, a rotary shaft connected with said wheel and passing through the opening in the conduit, a removable stuffing box surrounding the shaft at the end opposite from that of the wheel, a thrust bearing connected to and removable with the stuffing box and means for connecting the rotary shaft end exterior of the thrust bearing to a register.

4. A water measuring apparatus comprising a conduit having an opening, a water wheel rotatably supported in said conduit, a rotary shaft connected with said wheel and passing through the opening in the conduit, a depending protecting sleeve independent of the shaft and surrounding the same, a dished plate interposed between the end of the sleeve and water wheel, a stuffing box surrounding the shaft at the end opposite that of the wheel, a thrust bearing connected to the stuffing box, and means for connecting the rotary shaft end exterior of the thrust bearing to a register.

5. A water measuring apparatus comprising a conduit having an opening, a water wheel rotatably supported in said conduit, a rotary shaft connected with said wheel and passing through the opening in the conduit, a web and a step bearing supporting the lower end of the rotary shaft and preventing the whirl of the water before striking the water wheel, a depending protecting sleeve independent of the shaft and surrounding the same, a stuffing box surrounding the shaft at the end opposite that of the wheel, a thrust bearing connected to the stuffing box, and means for connecting the rotary shaft end exterior of the thrust bearing to a register.

In testimony whereof we have affixed our signatures in presence of two witnesses.

WILLIAM B. GREGORY.
ANDREW M. LOCKETT.

Witnesses:
 HENRY L. HUTSON,
 B. STANLEY NELSON.